United States Patent Office 3,344,079
Patented Sept. 26, 1967

3,344,079
AMINE ALANE TYPE COMPOSITION AND METHOD OF PREPARATION
Eugene C. Ashby, Atlanta, Ga., assignor to Ethyl Corporation, New York, N.Y., a corporation of Virginia
No Drawing. Filed Dec. 31, 1963, Ser. No. 334,900
6 Claims. (Cl. 252—188)

This invention relates to a new complex composition consisting of active hydrogen bonded to aluminum in complex formation with tetramethylethylene diamine, and to the method of preparation thereof.

Compounds containing aluminum hydrogen bonds are known in the art. For example, aluminum hydride, $AlH_3$, frequently referred to as alane, is available, essentially, only in complex form, and is very sensitive to atmospheric moisture and is inherently unstable, even at room temperature. Complexes of certain amine compounds and aluminum hydride are generally known, but these must be invariably prepared by the separate synthesis of aluminum hydride in solution in a complexing material, and the complexing thereof with an amino-type compound.

Bimetal compounds consisting of an alkali metal, aluminum and hydrogen, such as lithium aluminum hydride and sodium aluminum hydride, are also known. These generally are prepared by the reaction of aluminum chloride and the hydride of the alkali metal which is desired in the final bimetal complex hydride composition. Generally, compositions containing only aluminum as a metallic constituent, hydrogen, and other non-metal components have not been readily available, or have been available only by making aluminum hydride in solution by the inefficient technique already mentioned of reacting aluminum chloride and an alkali metal hydride, and thereafter complexing.

In my copending application, Ser. No. 261,515, now U.S. Patent No. 3,159,626, it is disclosed that an alane complex compound can be generated by the reaction of active subdivided aluminum, triethylene diamine, and hydrogen, resulting in the new composition $N(C_2H_4)_3N \cdot AlH_3$. Said product is, however, entirely insoluble in hydrocarbons, ethers and other non-aqueous solvents. In the presence of water, it decomposes, releasing the active hydrogen therein found. Also, unlike all other amine-alanes, that compound is thermally stable to >200° C.

The object of the present invention is to provide a new and novel alane type composition, particularly a solution thereof in a liquid medium, and a process for generation of such product.

The new product of the present invention is a solute or soluble complex consisting of tetramethylethylene diamine, aluminum, and hydrogen of active character, viz., releasable as hydrogen gas upon hydrolysis or reaction of the product with a proton donor, and therefore considered to be attached to the aluminum by direct bonding, forming or providing the moiety AlH wherein Al is one-third equivalent of aluminum. The solutes of the compositions of the present invention can then be expressed as

wherein $n$=about 1 to about 3.5 and $c$=about 0.5 to 1.2. Surprisingly, despite the fact that the active hydrogen is present in proportions of less than the 3:1 ratio formed in other aluminum active hydrogen compositions, these materials are soluble in hydrocarbons and other solvents.

The product of the present invention is made by a direct synthesis involving tetramethylethylene diamine in a liquid phase, activated aluminum, and hydrogen applied under substantial pressure, usually of the order of at least about 1,000 pounds per square inch and up to about 10,000 pounds per square inch. The reaction is carried out at reasonably elevated temperatures, preferably over 50° and up to about 200°, a preferred range of temperatures being about 70 to 160° C.

An excess of the tetramethylethylene diamine can be used, or an inert liquid reaction medium can be employed. Suitable media are cyclic ethers, lower alkyl ethers of lower polyethylene glycols, and aromatics or aliphatic hydrocarbons.

The aluminum employed should be finely subdivided, usually of the order of particles passing a 100 mesh screen, although this degree of subdivision is not highly critical and primarily relates to the rapidity of reaction. For the most consistent results the aluminum should be activated, and a preferred technique for activating the aluminum is to expose the raw, commercial grade aluminum in comminuted form to the action of an alkyl aluminum compound at elevated temperature for a period of several hours and with agitation. In addition, the presence of a hydrogen atmosphere is highly desirable. Thus, commercially subdivided aluminum can be agitated with a commercial triethyl aluminum supply at about 100 to 150°, and 1,000 p.s.i. hydrogen pressure, for a period of several hours, and will then be found to be quite reactive material. The aluminum is, generally, freed of the activating medium and is carefully preserved either moistened with this or with an inert material, or under perfectly dry inert gas, prior to use. Typical activation procedures are described in Patent 2,885,314.

The following working examples illustrate typical operations of the present invention.

Example 1

A charge was introduced to a Magna-Dash autoclave, consisting of 125 milliliters of tetramethylethylene diamine and about 11.75 grams of aluminum. The relative atomic-mole proportions of aluminum to the tetramethylethylene diamine was thus 0.5:1. The autoclave was sealed, hydrogen pressure was established at about 4,000 pounds per square inch and the reactor was heated to a temperature of 140° C., while providing continuous agitation. Owing to the temperature increase, the pressure rose to about 4600 pounds per square inch. The reaction temperature was maintained for about 120 hours, and then the autoclave and contents were cooled and the pressure released.

The excess tetramethylethylene diamine was removed in part by vacuum vaporization, hexane was added and a small amount of white solids precipitated, and these were filtered out. Further vacuum vaporization was applied to the liquid until the volume of liquid was reduced to between 2 and 3 milliliters. The liquid was diluted with benzene and analyzed for active hydrogen, aluminum and nitrogen.

The analysis showed the composition

It is seen that the hydrogen:aluminum ratio in the product was 1.1:1.

In this operation, a substantial excess of tetramethylethylene diamine was used to assure a substantial liquid phase during reaction. In the following example, a substantial amount of solvent was used, with a large excess of aluminum.

Example 2

The charge in this operation included about 11.7 g. of activated aluminum, 125 ml. tetrahydrofuran and about 7.7 g. of tetramethylethylene diamine. The aluminum:tetramethylethylene diamine, atom:mole ratio was thus about 5.6:1. The operating procedure was substantially the same, the charge being pressurized in the cold, with hydrogen, to 4,000 pounds per square inch pressure. The charge was heated, while agitating, to 140° C. resulting in a pressure build-up to 4,400 pounds per square inch. The operating temperature was maintained for 120 hours before terminating.

The reaction contents were filtered to separate unreacted aluminum, and the filtrate was vacuum evaporated, leaving about 4 ml. of viscous liquid. The liquid was diluted with benzene and the solution analyzed. Analysis of the filtrate showed the following solute composition:

$$[(CH_3)NC_2H_4N(CH_3)_2]Al_{2.44}H_{1.48}$$

The solids were also extracted, washed with benzene, the washings also analyzed. The analysis showed the washing contained a dissolved material having the composition $$[(CH_3)_2NC_2H_4N(CH_3)_2]Al_{3.2}H_{2.44}$$

Such material is apparently accumulated on the surfaces of the excess unreacted aluminum.

When the operating conditions are altered from those employed in the preceding examples, similar results are achieved, differing only in degree. Generally, temperatures in the lower range of the range of about 50 to 200° C. are desirable, although the rate of reaction is quite slow. The rate of reaction can be partially offset by further increases in the hydrogen pressure applied, so that the preferred pressure range is from about 4,000 to 10,000 pounds per square inch. Higher pressures are suitable but the cost of attaining such higher pressures will not usually justify the benefits obtained.

As illustrated in the examples, the atomic:mole charge ratios of aluminum to tetramethylethylene diamine can be widely varied, suitable ranges being from as low as 0.1:1 to 10:1. Preferably, the aluminum is at least in the proportions of at least about one and up to about ten atoms per mole of the diamine. When the higher proportions are utilized, the product will contain a higher proportion of aluminum per mole of tetramethylethylene diamine in the resultant product as illustrated by Example 2. When substantial excesses of aluminum as used, as in Example 2, the use of an inert reaction medium is particularly desirable to assure a high degree of fluidity. In addition to the tetrahydrofuran illustrated, benzene, toluene, heptane, nonane, 2,2,4-trimethyl pentane, naphthas, and other organic reaction media can be employed. The reaction media should be stable toward aluminum and hydrogen at the operating conditions used. The lower alkyl diethers of lower polyethylene glycols can be employed as reaction media. The proportions of reaction medium are not critical, a suitable range being from about 5 to 15 ml. per gm. of the aluminum charged.

The products obtained can be solutions of the complex in the reaction medium, or in excess tetramethylethylene diamine. Concentrations of the order of 50 to 85 weight percent of the desired complex material in the product solution are common. The product exhibits a high degree of stability on standing at ordinary storage conditions, and can be used for convenient generation of hydrogen for meteorological purposes or laboratory usage, by aqueous reaction. Similarly, the products, being liquids, are highly effective as reagents for the reduction of various organic chemicals having reducible moieties.

What is claimed is:
1. A composition of matter comprising a solution of the complex of tetramethylethylene diamine, aluminum and hydrogen having the empirical formula

$$[(CH_3)_2NC_2H_4N(CH_3)_2]Al_nH_{cn}$$

wherein $n =$ from 1 to 3.5 and
$c =$ about 0.5 to 1.2 in an organic medium which is a solvent for said complex, said organic medium being selected from the group consisting of tetramethylethylene diamine, tetrahydrofuran, benzene, toluene, and heptane.

2. The composition of claim 1 wherein said organic medium is tetramethylethylene diamine.

3. A process for producing the composition of claim 1 which comprises pressure hydrogenating aluminum and tetramethylethylene diamine at a temperature of about 50° C. to 200° C. and a pressure of at least about 1,000 pounds per square inch (p.s.i.).

4. A process as in claim 3 wherein the pressure hydrogenating of aluminum and tetramethylethylene diamine is conducted with the aluminum being in a proportion of more than 1 and up to about 10 atoms per mole of tetramethylethylene diamine, in the presence of an organic reaction medium substantially inert to said tetramethylethylene diamine, aluminum and hydrogen, in proportions of about 5 to 15 milliliters per gram of aluminum, and a pressure of about 1,000 to 10,000 p.s.i.

5. A process as in claim 3 wherein the aluminum is finely subdivided into particles, the greatest proportion of which pass through a 100 mesh screen.

6. A process as in claim 5 wherein the aluminum is activated by contacting said aluminum with triethyl aluminum.

References Cited

UNITED STATES PATENTS 3,132,141   5/1964   Rebauds _____ 260—242
3,159,626   12/1964  Ashby _____ 252—350 X LEON D. ROSDOL, *Primary Examiner.*

SAMUEL H. BLECH, *Examiner.*

M. WEINBLATT, *Assistant Examiner.*